UNITED STATES PATENT OFFICE.

HEINRICH HELBING, OF LONDON, ENGLAND, AND GUSTAVE PERTSCH, OF LYONS, FRANCE, ASSIGNORS TO LA SOCIÉTÉ CHIMIQUE DES USINES DU RHÔNE, ANCIENNEMENT GILLIARD, P. MONNET ET CARTIER, OF LYONS, FRANCE.

COLLODION MIXTURE.

SPECIFICATION forming part of Letters Patent No. 628,463, dated July 11, 1899.

Application filed December 24, 1897. Serial No. 663,422. (No specimens.)

*To all whom it may concern:*

Be it known that we, HEINRICH HELBING, of London, England, and GUSTAVE PERTSCH, of Lyons, France, have invented certain new and useful improvements in the preparation and application of coating and insulating materials for medical and other purposes, (the same being the subject-matter of Letters Patent in Great Britain, No. 25,779, dated October 23, 1896,) of which the following is a specification.

The object of this invention is the preparation and application of coating solutions which may beneficially be employed in surgery as a substitute for adhesive plasters and for collodion, traumaticin, and the like and in the arts for various technical purposes.

Alkyl chlorids or mixtures of the same with or without the addition of alcohol or ether possess the property of dissolving and holding in solution various gums, resins, fatty matters, wax or gutta-percha, nitrocellulose, and similar substances or mixtures of the same, such as are used in the production of collodion and traumaticin. According to this invention use is made of the above-mentioned properties of such of the alkyl chlorids as have a boiling-point below 38° centigrade—namely, methyl and ethyl chlorids—and a solution is made with either or both of these (with or without the addition of alcohol or ether to facilitate solution) of any of the above-mentioned gummy or fatty materials or a mixture of them in such a proportion that on the evaporation of the volatile matter the residue will attain the required degree of adhesiveness and suppleness or such other properties as may be required or desirable when applied to the purpose for which it is intended. This solution is placed, with a considerable excess of methyl or ethyl chlorid, if required, in a receiver of glass or metal having a suitable orifice which can be hermetically sealed at will with a close-fitting cap. When it is required to make use of the solution, the cap is removed and the vessel inclined as may be necessary. The heat of the hand holding the vessel, or even of the surrounding atmosphere if of the ordinary temperature of a room, then immediately causes the ethyl or methyl chlorid inside the receiver to begin to evaporate. This evaporation causes internal pressure, and the solution is thereby ejected through the orifice in a fine jet or spray. By properly directing the orifice of the receiver the solution can be distributed over the part required. At ordinary temperatures the methyl or ethyl chlorid in the ejected solution will very rapidly evaporate, leaving the residue, consisting of the aforesaid gummy or fatty matter, deposited in a uniform coat, layer, or varnish on the desired surface. This solution is particularly useful in those cases where it is desired to form a protecting-coat to a wound or to healthy or diseased tissue, and since the ethyl or methyl chlorid is a local anesthetic this mode of application will cause the minimum of pain. If necessary, iodoform or other soluble antiseptics may be incorporated in the solution. This solution should only be applied and used in connection with substances which are soluble in alkyl chlorid, such as ethyl or methyl chlorid, adding, to increase solubility, alcohol or ether, as will be well understood by chemists.

What we claim, and desire to secure by Letters Patent, is—

1. As a new article of manufacture, ethyl chlorid containing collodion dissolved therein.

2. As a new article of manufacture, an alkyl chlorid having a boiling-point at or below 38° centigrade containing collodion dissolved therein.

In witness whereof we have hereunto signed our names in the presence of subscribing witnesses.

HEINRICH HELBING.
GUSTAVE PERTSCH.

Witnesses to the signature of Heinrich Helbing:
GEORGE BELOE ELLIS,
THOMAS LAING WHITHEAD.

Witnesses to the signature of Gustave Pertsch:
RODOLPHE PFISTER,
MARIUS VACHER.